Figure 1:
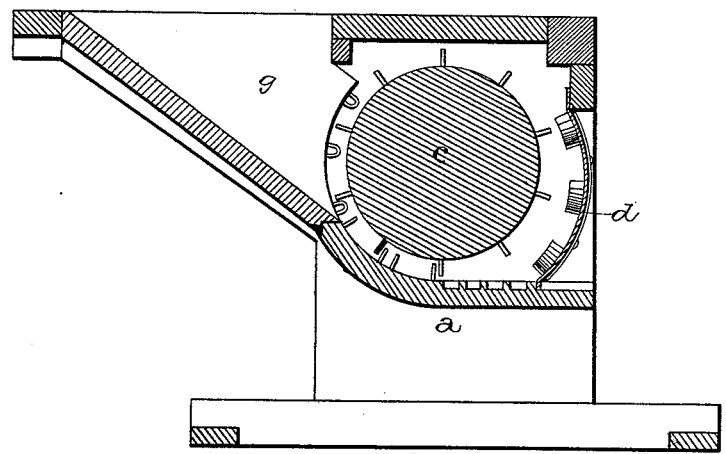
Figure 2:
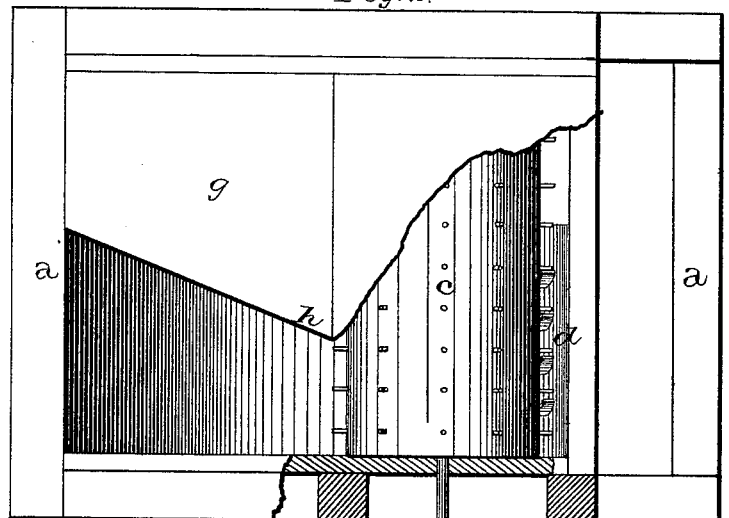
Figure 3:
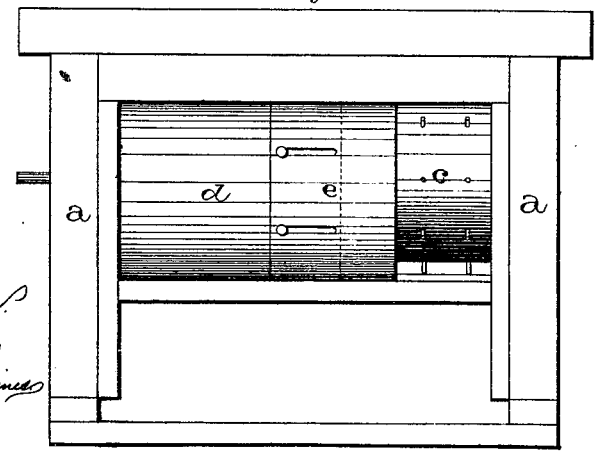

J. BROWN.
Thrashing-Machine.

No. 198,187.      Patented Dec. 18, 1877

WITNESSES:
J. W. Garner
William S. D. Haines

INVENTOR:
J. Brown
per
F. A. Lehmann
Atty

UNITED STATES PATENT OFFICE.

JONATHAN BROWN, OF AYLMER, ONTARIO, CANADA.

IMPROVEMENT IN THRASHING-MACHINES.

Specification forming part of Letters Patent No. 198,187, dated December 18, 1877; application filed October 30, 1877.

*To all whom it may concern:*

Be it known that I, JONATHAN BROWN, of Aylmer, in the county of Elgin and Province of Ontario, Canada, have invented certain new and useful Improvements in Clover and Timothy Thrashing Attachments; and I do hereby declare the following to be a full, clear, and exact description of the invention, such as will enable others skilled in the art to which it pertains to make and use it, reference being had to the accompanying drawings, which form part of this specification.

My invention relates to an improved clover, timothy, and grass thrashing machine; and it consists in the arrangement and combination of parts, that will be more fully described hereinafter, whereby a cheap, simple, and efficient thrasher is produced, that not only thrashes the clover, timothy, or grass without loss, but with a very little expenditure of power.

The accompanying drawings represent my invention.

$a$ represents a suitable frame of any desired size, shape, or construction, in which is journaled the thrashing-cylinder $c$, which is armed with any suitable number of teeth of any shape or size.

The interior of the frame under the roller is made concave, and is also provided with teeth, so as to catch the stalks passing through and hold them back while the teeth on the cylinder strips off the seed. The teeth on this bottom are arranged spirally, so that the seed and bolls will be carried round and round with the cylinder, until the seed are thoroughly thrashed loose from every other substance; or the teeth may be placed in straight lines.

Upon the rear side of the frame the space back of the roller is partially closed by the concave and toothed back $d$, which is provided with a slide, $e$, at its inner end, so that it can be lengthened whenever it is necessary, and thus increase the distance the seed will have to travel before they escape from the machine.

In the mouth of the machine, where the cylinder is fed, is placed the toothed concave block $g$, which is triangular in shape, and much wider at the bottom than at the top, as shown. By making the block concave on its inner side, it coincides with the shape of the cylinder, so as to cause its teeth to assist in thrashing the seed as they are carried round and round. As this block is both wider and thicker at its lower end, its inner side $h$ forms an incline from the top to the bottom, and acts as a guide to direct the clover or grass down to one end of the cylinder.

If desired, the teeth on the concave $d$ may also be arranged in spiral or curved lines, so as to assist the seed in traversing the whole width of the frame.

The concave portions of the back $d$ and the block are shown here as provided with spikes or teeth; but this is not necessary, as they may be entirely dispensed with, if so desired.

In the construction of my machine, the various parts will be made of either wood or iron, as may be preferred.

The operation of my machine is as follows: The feed is poured into the mouth of the machine, but which, owing to the shape of the block $g$, can only come in contact with the cylinder at one end. The revolutions of the cylinder draw the feed into the frame, and then the spiral arrangement of the teeth cause the feed to be carried round and round until it has traversed the length of the cylinder as far as the end of the slide. In some cases, as where the seed are easily separated, the slide need not be drawn out; but where the seed are not easily thrashed loose, by drawing out the slide the seed will be made to travel a greater distance, and thus receive a greater amount of thrashing.

Having thus described my invention, I claim—

1. In combination with toothed cylinder $c$, the removable block $g$, having the toothed concave side concentric with the cylinder and the inclined side $h$, substantially as shown.

2. In combination with the revolving toothed cylinder $c$, removable toothed block $g$, having inclined side $h$, the concave back $d$, provided with the slide $e$, substantially as set forth.

In testimony that I claim the foregoing I have hereunto set my hand and seal this 16th day of October, 1877.

JONATHAN BROWN. [L. S.]

Witnesses:
 T. M. NAIRN,
 W. A. GLOVER.